G. KUSH.
PROCESS FOR MAKING RUBBER PRINTING PRESS BLANKETS.
APPLICATION FILED FEB. 10, 1912.
1,096,112.  Patented May 12, 1914.
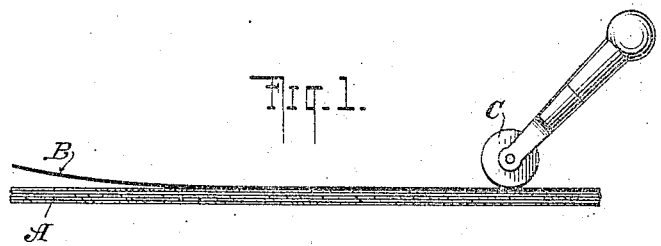
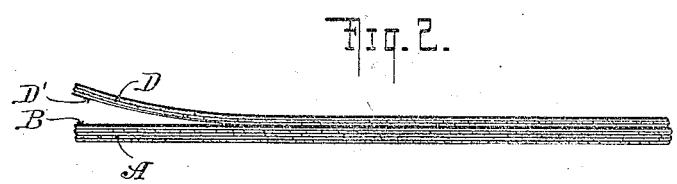
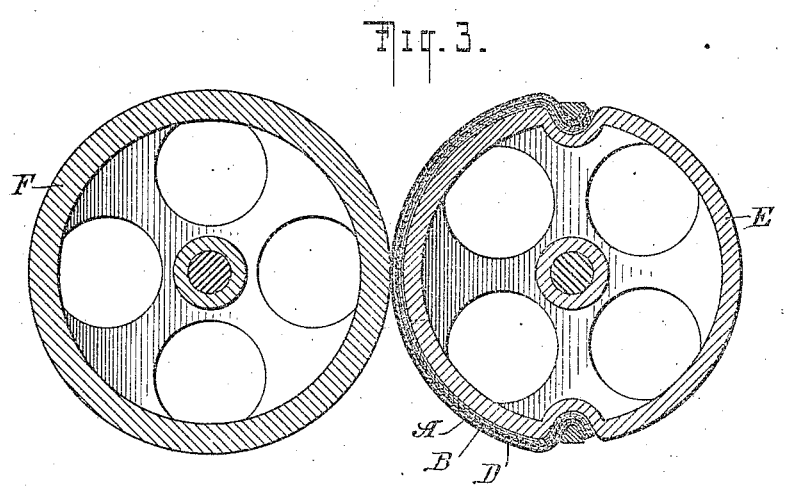
WITNESSES
INVENTOR
GUSTAVE KUSH
BY
ATTORNEYS

UNITED STATES PATENT OFFICE.

GUSTAVE KUSH, OF NEW YORK, N. Y.

PROCESS FOR MAKING RUBBER PRINTING-PRESS BLANKETS.

1,096,112.  Specification of Letters Patent.  Patented May 12, 1914.

Application filed February 10, 1912. Serial No. 676,875.

*To all whom it may concern:*

Be it known that I, GUSTAVE KUSH, a citizen of the United States, and resident of Manhattan, city, county, and State of New York, have invented a certain new, useful, and Improved Process for Making Rubber Printing-Press Blankets, of which the following is a specification.

My invention relates particularly to a process which is adapted to be used by the operator in connection with the printing press whereby it is possible, when a new blanket is required to construct it in the press room from pieces of surface material and of backing material cut from stocks of these materials kept on hand for the purpose. My process also enables one by simple and inexpensive methods to resurface one of the blankets made as above or to apply a new vulcanized rubber surface member to an old blanket of ordinary construction by applying and attaching the new surface member to the back of the old blanket, the entire work being done in the press room. My process may be used to prepare or resurface printers', lithographers', offset and newspaper press blankets of all kinds where when the working surface becomes defective, the blanket becomes useless, and with the old style blanket is discarded unless repaired at great expense at the factory.

The accompanying drawings indicate steps in my process for resurfacing old or constructing new blankets.

Figure 1 indicates one method of attaching of the unvulcanized rubber sheet to the backing member; Fig. 2 indicates placing the new vulcanized rubber surface member on the unvulcanized rubber sheet on the backing member and Fig. 3 indicates in section the blanket attached to the cylinder and under pressure in the press.

For preparing new press blankets my process may be carried out as follows: The operator takes a strip or section of the backing material A, which may consist of one or more layers of cotton or other suitable fabric vulcanized together in the usual manner, cuts it to the proper length and width, cleans one face thereof by thoroughly washing with turpentine, benzin or other fluid adapted for the purpose. A sheet B of pure rubber, unvulcanized, is then cut to the size desired for the blanket surface and one face thoroughly softened by washing with turpentine, benzin or other suitable solvent, and placed in contact with the cleaned surface of the backing member A, after which the rubber sheet is pressed into adhering contact by any suitable means as by a hand roller C, indicated in Fig. 1 of the drawings.

The vulcanized rubber surface member D is then prepared by cutting the proper width and length from a stock of surface material which has been made in the usual manner from one or more layers of suitable fabric, such as long staple cotton cloth covered with new rubber, sheeted, spread and calendered, plated and vulcanized after being brought to the desired or any suitable thickness. The back face of the surface member D is then thoroughly cleaned by washing with turpentine, benzin or other suitable fluid. The outer face of the unvulcanized rubber sheet B, secured as previously described, to the backing member A, is now softened by the application of turpentine, benzin or other solvent and the surface member is placed with its cleaned back face D' in contact with the tacky face of the unvulcanized rubber sheet B. The blanket thus assembled, is then placed on the cylinder E of the printing press and the press is started thereby subjecting the blanket on the cylinder E to uniform pressure from the printing rollers such as F in Fig. 3. A sheet of paper is run through the press, at the same time, to facilitate the proper seating of the surface member under the pressure of the printing rollers. The new blanket is thus completed and ready for use in the press.

Rubber press blankets, made in the usual well known way have the backing and surface members united and vulcanized at the factory. If the surface of such blankets become creased, pitted or otherwise defective in use they no longer meet the requirements for perfect work and must be discarded and a new blanket substituted. As such blankets are expensive and at most, usually last only a few months before it becomes necessary to replace them, my process hereinbefore described may be utilized to reduce expenses by enabling the operator to construct or resurface the blanket as desired. For instance, if the surface member D of the blanket constructed according to my process becomes scarred or defective, it may be removed by softening the layer of unvulcanized rubber B and thereafter repeat my process as described and secure a new surface member D to the old backing member A.

My process is equally applicable for securing a new surface member to the old vulcanized rubber press blanket as usually constructed. I do not accomplish this by taking off the old surface member, for as previously pointed out, this cannot be done satisfactorily except by expensive methods at the factory, but I merely turn the old blanket over and secure the new surface member to the back face thereof. In this operation the old blanket, with the face of its cloth backing member outward, becomes the backing member A in the drawings and the back face of the old blanket is thoroughly washed with turpentine, benzin or other suitable fluid and cleaned of oil and grease. A sheet of unvulcanized rubber B is then secured to the cleaned back of the old blanket by moistening one face of the rubber sheet with turpentine, benzin or other solvent, spreading it over the cleaned surface and pressing it into close adhering contact by rolling it smooth with the hand roller as indicated in Fig. 1 or by other suitable device. A new surface member D of the desired thickness is then prepared and its back face cleaned as hereinbefore described, and continuing my process, the new surface member may then be secured to the old blanket in the manner previously described. That is, the face of the unvulcanized rubber sheet is softened and the cleaned face of the new vulcanized rubber surface member mounted thereon after which the blanket is mounted on the cylinder of the printing press with its old rubber surface in contact with the cylinder, and the press started, a sheet of paper being run through as previously, whereby uniform pressure is applied to the new surface member, and the old blanket is converted into a serviceable blanket with a new surface.

From the operation of my process as herein described, it will readily be understood that as often as desired, a new surface member may be attached to the old blanket as a backing member by softening the unvulcanized rubber sheet with a suitable solvent so as to remove the defective surface member and then repeat the process for attaching a new surface member. Preferably the unvulcanized rubber sheet is first attached to the backing member but obviously it might be attached to the other member or to both at the same time; and since my process may be carried out by the operators in the press room, the saving of time and expense by its use is readily apparent.

My process is applicable for constructing or renewing rubber press blanket as required for many different types of printing or other presses and variations may be resorted to without departing from the spirit and scope of my invention as set forth in the appended claims.

I claim:—

1. The process of preparing rubber printing press blankets which consists in securing a vulcanized rubber surface member to a backing member by first treating the back surface of the vulcanized member and one surface of the backing member with a cleaning fluid, then bringing the two surfaces into juxtaposition upon a sheet of unvulcanized rubber which has just been treated with a fluid adapted to soften it and render it adhesive and then subjecting the blanket to uniform pressure between cold rollers.

2. The process of resurfacing rubber printing press blankets which consists in securing a new vulcanized rubber surface member to the back surface of an old blanket by suitably cleaning the back face of the new surface member and the back face of the old blanket, interposing between said cleaned faces a sheet of unvulcanized rubber, previously softened and rendered adhesive by the application of a suitable fluid and then securing the blanket in the printing press and subjecting it to uniform pressure.

3. The process of resurfacing rubber printing press blankets which consists in securing a new vulcanized rubber surface member to the back surface of an old blanket by suitably cleaning the back face of the new surface member and the back face of the old blanket, softening and rendering adhesive by a suitable fluid one face of a sheet of unvulcanized rubber and securing the same to one of said cleaned faces by pressure with a suitable roller, softening the other face of the unvulcanized rubber sheet and placing thereon the cleaned face of the other member and then securing the blanket in the printing press and subjecting it to uniform pressure.

In testimony whereof, I have hereunto set my hand in the presence of two subscribing witnesses.

GUSTAVE KUSH.

Witnesses:
M. H. LOCKWOOD,
JOHN A. KEHLENBECK.